Oct. 6, 1964 W. E. HAMEL 3,151,434
SICKLE
Original Filed April 2, 1962 2 Sheets-Sheet 1

WILLIAM E. HAMEL
INVENTOR
HUEBNER & WORREL
ATTORNEYS
BY
Richard M. Worrel

Oct. 6, 1964 W. E. HAMEL 3,151,434
SICKLE
Original Filed April 2, 1962 2 Sheets-Sheet 2

WILLIAM E. HAMEL
INVENTOR
HUEBNER & WORREL
ATTORNEYS
BY

United States Patent Office 3,151,434
Patented Oct. 6, 1964

3,151,434
SICKLE
William E. Hamel, Dos Palos, Calif., assignor to
Cal-Gard, Inc., a corporation of California
Continuation of application Ser. No. 184,269, Apr. 2,
1962. This application Mar. 9, 1964, Ser. No. 358,134
2 Claims. (Cl. 56—296)

The present invention relates to a sickle for mowers, swathers, and similar implements for mechanically cutting alfalfa, vetch, straw, grain crops, soy beans and other fabaceous crops. More particularly, the present sickle is adapted effectively to cut the most dense stands of such crops even under the most adverse conditions without clogging. This application is a continuation of my co-pending application Serial No. 184,269, filed April 2, 1962, entitled Sickle, which is being abandoned in favor of this application.

Conventional sickle bar assemblies usually employ a pair of mounting bars, each having a plurality of laterally outwardly extended teeth, one or both of which are reciprocated so that the teeth of each bar coact in shearing engagement. These prior art devices have been subjected to certain difficulties. In dense stands of fabaceous crops, or even when sparser crops are encountered in a dampened condition, conventional sickle bars tend to clog and accumulate debris between the teeth and supporting bars thereof. As a result, such accumulation opens the teeth so that they no longer coact in the intended cutting action. Other devices of the prior art dispose the tooth supporting bars in spaced relation whereby the teeth angularly coact so that the teeth are subjected to periodic violent twisting action as the teeth alternately engage and pass into the spaces between the teeth. Such twisting action results in excessive concentration of wear in certain locations along the tooth edges and ineffective cutting action in other portions thereof wherein the tendency to jam is aggravated and far greater demands are made on the source of the driving power. Also, the rapidly repeated twisting of the mounting bars incident to reciprocation of the teeth in and out of engagement frequently results in metal fatigue and breakage. Additionally, the prior art devices have included elongated earth engaging lower guards which extend forwardly from the sickle bar a substantial distance beyond the forward ends of the teeth with a wrap-around rearwardly extended top portion disposed in overlying upwardly spaced relation to the teeth. The upper guard portion is intended merely to hold the crop in upstanding attitude for optimum shearing engagement by the teeth. However, in many instances the guards permit large bunches of the crop to be directed into the cutting teeth in a volume which cannot be readily accommodated thereby. The forwardly extended lower guards also, in many instances, tend to mash or bend the stalks of such plants thereby permitting the mower blades to ride over and pass the plants without cutting the same.

Therefore, it is an object of the present invention to provide a sickle, relatively free from clogging, which obviates the difficulties encountered with conventional sickles.

Another object is to provide an improved sickle which is particularly suited to the cutting of fabaceous crops under conditions restricting the use of conventional sickles.

Another object is to provide such a sickle which precludes mashing and bending of material ahead of the cutting portion of the sickle.

Another object is to provide an improved sickle having forwardly extended teeth which are individually constrained against twisting by providing sets of upper and lower guard members.

Another object is to provide a sickle wherein the teeth include outwardly converging edges disposed in substantially flat shearing engagement with their corresponding lower guards.

Another object is to provide an improved sickle wherein the upper guards individually springably urge the teeth intimately against their respective lower guards to minimize the entrance of material therebetween and attendant separation of the teeth from the guards.

Other objects and advantages of the present invention will become more fully apparent in the subsequent description in the specification.

Figure 1:
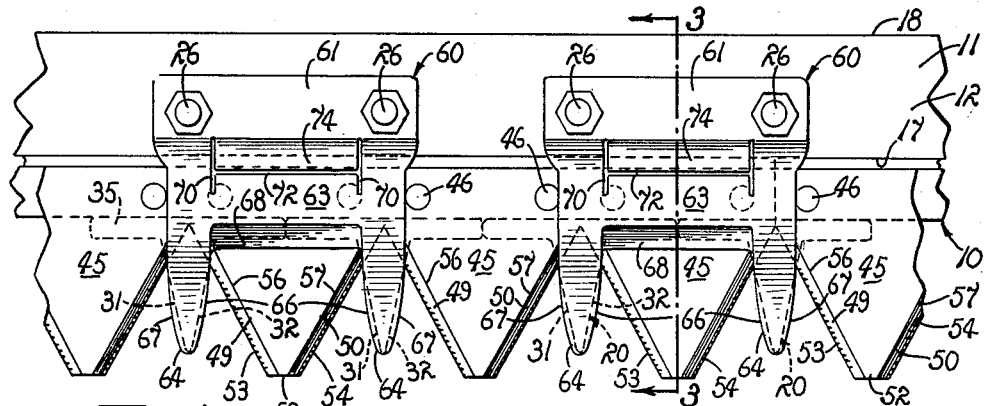
FIG. 1 is a fragmentary top plan view of a sickle assembly embodying the principles of the present invention.

Referring more particularly to the drawings, a sickle assembly embodying the principles of the present invention is indicated generally at 10. The assembly is adapted to be pivotally mounted on a tractor or other suitable earth traversing vehicle, not shown. Also, suitable actuating means is provided between the stickle assembly and its mounting vehicle to raise and to lower the assembly between a substantially horizontal mowing position and a substantially vertical carrying position, as is well known in the art.

The sickle assembly 10 includes an elongated mounting arm 11 having an upper mounting surface 12, an opposite lower mounting surface 14 and a plurality of substantially vertically disposed apertures 16 extended therebetween in longitudinally spaced relation. The arm also includes opposite forward and rearward side portions 17 and 18, respectively.

Figure 4:
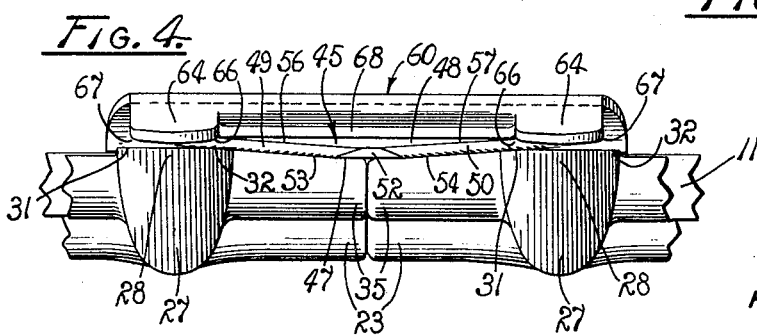
FIG. 4 is an enlarged front elevation of the sickle looking generally in the direction of the arrows on line 4—4 of FIG. 1.

A plurality of lower earth engaging guards 20 provide rearwardly disposed mounting flanges 21 which are adapted to be fitted to the lower surface 14 of the arm 11. The flanges are positioned thereon by pairs of upwardly extended projections 23 which are disposed against the forward side 17 of the arm. The flanges provide pairs of spaced apertures 24 therethrough which are aligned with adjacent pairs of the apertures 16 through the arm 11 to receive carriage bolts 26. The lower guards also include upwardly forwardly curving under surfaces 27 which terminate in substantially pointed outer ends 28. As best shown in FIG. 4, the guards further include upper substantially flat surfaces 30, each of which provides opposite outwardly convergent side edges 31 and 32. The rearward portions of the upper surfaces 30 are relieved to provide transversely aligned notches 34 therethrough adjacent to the forward side 17 of the mounting arm 11. Pairs of integrally transversely oppositely extended arms 35 are disposed immediately forwardly of the notches 34 in abutting relation with corresponding arms on adjacent lower guards to act as spacers and prevent longitudinal shifting of the guards relative to each other along the arm 11.

An elongated runner bar 40 is disposed within the aligned notches 34 of adjacent guards which has a driven connection to a suitable powered reciprocating mechanism, not shown, located on the mounting vehicle. The runner bar has an upper surface disposed slightly above the upper surface 30 of the lower guard. The runner bar also includes a plurality of substantially vertically disposed apertures 41 therethrough which are grouped in paired sets longitudinally along the bar. A plurality of shims 42 are disposed upon the upper surface 12 of the arm 11 in upwardly aligned relation with the flanges 21 of the lower guards and with each shim including pairs of apertures therethrough to receive the bolts 26. The shims also individually include forward depending shoulders 43 disposed between the forward side 17 of the arms and the runner bar 40.

A plurality of cutting teeth 45 are mounted upon the upper surface of the runner bar 40 for reciprocation therewith by bolts 46 extended through the apertures 41 and rearwardly overhang the bar slidably to engage the shims 42. As viewed in FIG. 3, the aligned notches 34 through the lower guards provide sufficient relief to accommodate the bolts 46 during reciprocation of the runner bar 40. The teeth include substantially flat lower surfaces 47 slidably engaged with the upper surface 30 of the lower guards, substantially flat upper surfaces 48, and laterally outwardly convergent side edges 49 and 50. The side edges terminate in laterally outwardly extended apices 52 which are equally spaced longitudinally of the runner bar 40 in substantially the same relation as the lower guards 20 and are extended somewhat beyond the outer ends 28 of the lower guards. The side edges 49 and 50 are upwardly beveled so as to provide lower serrated cutting edges 53 and 54 and upper marginal shoulders 56 and 57, respectively.

Figures 2, 3, 5:
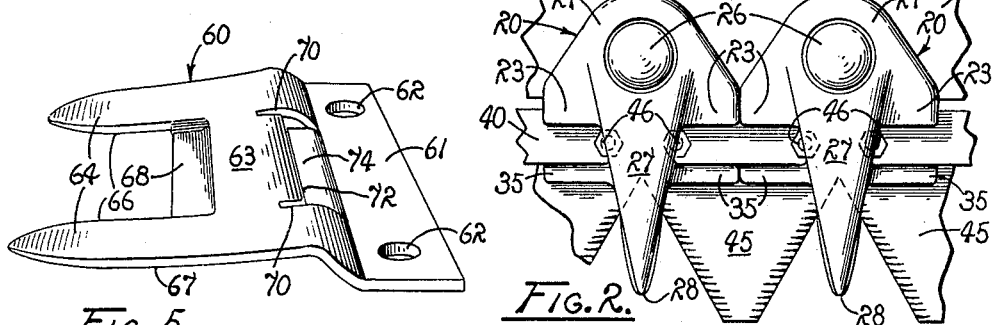
FIG. 2 is an enlarged fragmentary bottom plan view of the sickle assembly of FIG. 1.
FIG. 3 is a somewhat enlarged transverse vertical section through the sickle assembly, taken on line 3—3 of FIG. 1.
FIG. 5 is a perspective of the upper guard removed from the assembly of the preceding figures.

A plurality of upper guards 60 provide rearward mounting portions 61 having pairs of spaced apertures 62 therethrough which are registrable with the apertures 16 for individually mounting the upper guards on the shims 42 in overlying relation to the teeth 45. As best shown in FIG. 5, the upper guards provides upwardly arcuately formed intermediate web portions 63 and pairs of opposite continuously downwardly, forwardly sloping fingers 64 juxtapositioned to the lower guards. The fingers include substantially flat lower surfaces 65 and longitudinal opposite inner and outer side edges 66 and 67, respectively, slidably engageable with the shoulders 56 and 57 of the teeth 45. The intermediate web portions 63 of the upper guards provide downwardly bent shoe members 68 which slidably engage the upper surface 48 of the teeth. Pairs of opposite slots 70 individually extend through the upper guards in substantial alignment with the inner edges 66 of the fingers 64 but terminate short of the shoe members 68 at their forward ends and short of the rearward mounting portions 61 at their rearward ends. Transversely extended slots 72 are formed through the upper guards intermediate the ends of the slots 70 by which heel members 74 are formed in substantially coplanar relation with the shoe members 68 also slidably to engage the upper surfaces of the teeth. The upper guards are preferably formed of a resiliently springable metallic sheet material so that when assembled, the finger, shoe and heel portions thereof resiliently urge and maintain the teeth in intimate contact with the upper flat surfaces 30 of the lower guards.

Figure 6:
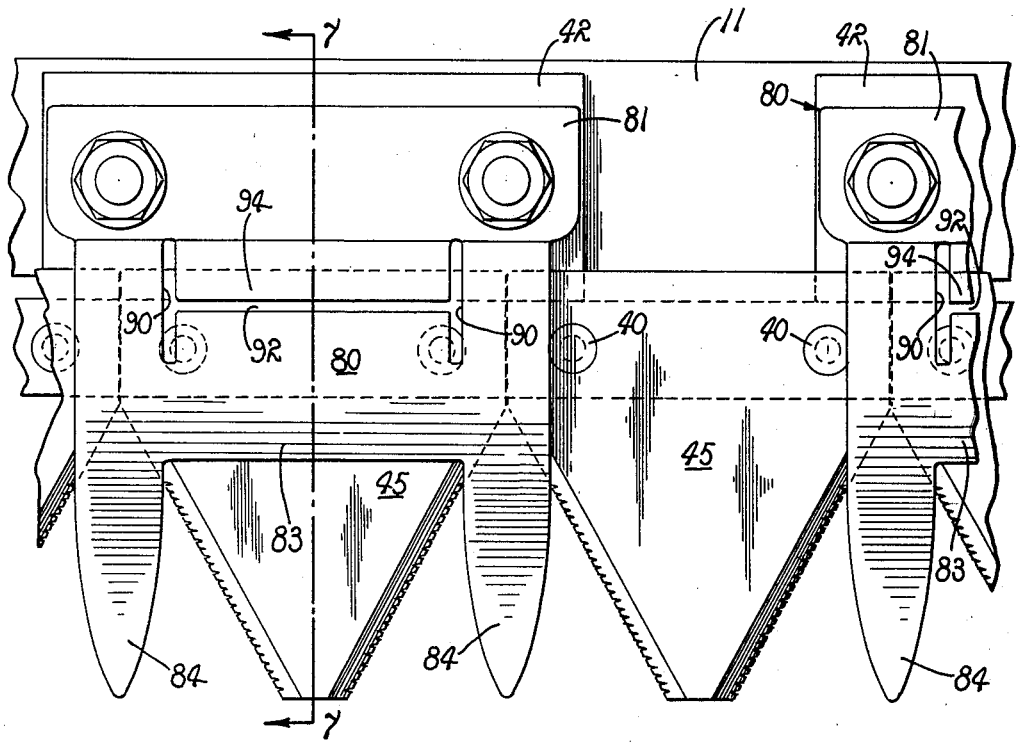
FIG. 6 is a fragmentary top plan view of a sickle embodying a second form of the top guard of the present invention.
Figure 7:
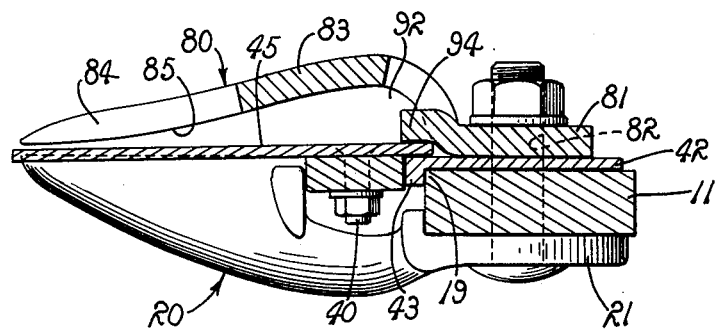
FIG. 7 is a transverse vertical section of the second form, taken on line 7—7 of FIG. 6.

A second form of the upper guard is shown generally at 80 in FIGS. 6 and 7. As shown, the second form of the upper guard is adapted to be mounted upon the mounting arm 11 having the lower guards 20, the runner bar 40 and the teeth 45 in nearly identical relation, as described in the first form of the invention and not here repeated. The upper guards 80, however, are formed of a non-springable mild steel material, preferably of a somewhat greater cross-sectional thickness than the guards 60 of the first form. The upper guards 80 include mounting portions 81 having pairs of apertures 82 therethrough aligned with the carriage bolts 26 for mounting on the arm 11. The guards further include intermediate web portions 83 interconnecting pairs of opposite laterally outwardly extended fingers 84. The fingers congruently overlie, and provide lower surfaces 85 downwardly converging toward, the lower guards 20 in juxtaposition to the upper surfaces 48 of the teeth 45. The intermediate web portions include a pair of opposite laterally extended slots 90 which are interconnected intermediate their ends by a longitudinally extended slot 92. Such slotting arrangement enables the forming of a heel portion 94 downwardly bent therefrom slidably to engage the rearward portion of the teeth 45. As in the first form, the apex portions 52 of the teeth are laterally outwardly extended from the ends of the lower guards and from the fingers 84 of the upper guards.

Operation

The operation of the described embodiments of the subject invention is believed to be readily apparent and is briefly summarized at this point. With the sickle bar assembly 10 of the first form of the present invention carried in the substantially horizontal operating position of FIG. 4, the runner bar 40 is reciprocated to motivate the teeth 45 slidably upon the upper surfaces 30 of the lower guards 20. Each tooth is indexed from the position shown in FIG. 1 with the teeth centered between a pair of lower guards to a position centered between adjacent sets of lower guards at the limits of such reciprocation. When the teeth are disposed at either of said limits of reciprocable movement, the shoes 68 and the heels 74 of the upper guards tightly slidably engage the upper surfaces 48 of the teeth. As the teeth are reciprocated to the left, as viewed in FIG. 1, the cutting edges 53 travel in progressively outwardly shearing engagement along the edges 32 of the lower guards. During return travel to the right, the opposite cutting edges 54 of the teeth coact with the opposite edges 31 of the lower guard in identical sliding shearing engagement therewith. During this reciprocable movement, the flat lower surfaces 65 and the side edges 66 and 67 of the fingers 64 of the upper guards alternately ride along the shoulders 56 and 57 progressively to urge the edges 53 and 54 of the teeth against their respective corresponding edges of the lower guards. This action causes the fingers and intermediate web portions 63 of the upper guards to flex upwardly to impose a greater force against the edges of the teeth effectively resisting separation of the lower guards and the teeth. Such flexing causes the shoe 68 and the heel 74 to be raised out of contact with the teeth. With such arrangement, the teeth are continually urged against the lower guards in all positions of the teeth relative thereto alternately by the fingers 64 and thence by the heels and shoes 68 and 74 of the upper guards.

Concurrently, with reciprocation of the runner bar 40 and the teeth 45, the sickle is transported in a direction transversely of the longitudinal axis of the mounting arm 11. With such movement, the apices 52 of the teeth which, by their extension beyond the lower guards, tend to work between and to distribute the stalks of the crop to be severed over the cutting edges 53 and 54 of the teeth and the edges 31 and 32 of the lower guards. The material severed thereby is then able easily to flow over the upper guards 60 and be disposed rearwardly thereof without clogging the reciprocating portions of the sickle. For example, when the guards are permitted to extend beyond the sickle teeth, as is the conventional practice, the well-known clogging and jamming occurs when heavy or wet crops are encountered. When the fingers 60 are of such length that the apices of the teeth 45 extend beyond them, the reciprocation of the teeth has a stirring or distributing effect on encountered crops successfully minimizing or obviating such clogging. The projection of the teeth only a fraction of an inch beyond the fingers of the guards has a most dramatic effect in this regard.

In the operation of the second form of the invention of FIGS. 6 and 7, the runner bar 40 and the teeth 45 are reciprocated relative to the lower guards 20 in an identical manner as that described for the first form. In this form, however, the upper guards 80 contact the upper surfaces of the teeth only along the rearward heel portions 94 thereof. The fingers 84 of the upper guards are primarily intended to maintain the stalks of the plants to be severed in an upright attitude more effectively to be severed by the shearing action between the teeth and the lower guards. Any material tending to wedge between the fingers of the guards and the teeth is either dispelled by the reciprocation of the teeth or is permitted to slide rearwardly into the enlarged opening between the web portion of the upper guards and the teeth where it is easily longitudinally discharged by reciprocal movement of the teeth. As in the first form, the fingers and web portions of the upper guard are gradually rearwardly upwardly sloped so as to provide a substantially smooth discharge surface over which material being severed is permitted rearwardly to slide.

In both forms of the invention, the upper guards effectively hold the teeth in cutting engagement with the lower guards, separation is virtually precluded and a far superior cutting action is assured. By minimizing separation of the teeth and the lower guards, wearing action tending to round the shearing edges thereof is correspondingly minimized. The more effective cutting action enables the cutting of heavier crops and even crops that are too wet to cut with conventional sickles with little or no clogging and jamming. The extension of the outer ends of the teeth beyond the upper and lower guards enables the teeth to precondition crops to be severed and further reduces clogging tendencies. Furthermore, the teeth are constrained substantially flatly against the lower guards which greatly reduces wear between the edges of the teeth and the guards as compared to the relatively large amount of wear experienced with conventional sickles having angularly disposed shearing edges.

It should be noted that the guards 60 and 80 are with equal facility incorporated into new implements or utilized as upper guard replacements for used implements employing sickles to attain the described operational advantages.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a mower the combination of an elongated mounting arm adapted for movement in a predetermined forward direction substantially normal to the direction of elongation; a plurality of elongated lower guards, each having respective opposite ends, one of which is rigidly secured to said arm, the guards being mounted in substantially uniformly spaced relation and forwardly extended from the arm, each of said lower guards having a bar-receiving notch intermediate said opposite ends and a pair of integrally transversely oppositely extended arms of predetermined length in abutment with the arms of adjacent lower guards when mounted in said spaced relation, said arms of each guard affording a rearwardly facing bearing surface in opposed relation to said mounting arm and immediately adjacent to said notch, the notches of said guards being aligned to define an elongated substantially rectilinear groove, said guards having substantially flat upper surfaces adjacent their respective free ends and disposed in a common plane; an elongated runner bar disposed in said elongated groove defined by said notches and having at least one substantially flat bearing surface in contact with said rearwardly facing bearing surface of said lower guards; a plurality of cutting teeth mounted on the bar and outwardly extended therefrom for reciprocation with the bar, said teeth having flat lower surfaces slidably engageable with the upper surfaces of the lower guards and apices forwardly disposed from the bar and spaced longitudinally of the bar in substantially the same relation as the lower guards, said apices projecting forwardly from the free ends of the guards; upper guards mounted on the arm in overlying relation to the teeth, said upper guards providing fingers forwardly extended from rearward ends adjacent to the arm, disposed in juxtaposition to the lower guards and terminating in forward ends disposed rearwardly of the apices of said teeth, the fingers providing substantially flat lower surfaces slidably engageable with said teeth, adjacent fingers being interconnected in paired relationship by substantially flat webs rearwardly of said forward ends, the web of each pair of fingers terminating adjacent to the rearward ends of said fingers, said web affording an opening intermediate the ends of the fingers and substantially overlying the bar-receiving notches of said lower guards to afford egress for plant cuttings during operation; and means clamping the upper guards to said mounting arm and urging said fingers into slidable engagement with said tooth.

2. In a mower the combination of an elongated mounting arm adapted for movement in a predetermined forward direction of elongation; a plurality of elongated lower guards, each having respective opposite ends, one of which is rigidly secured to said arm the other being a forwardly projecting free end, the guards being mounted in substantially uniformly spaced relation and forwardly extended from the arm, each of said lower guards having a bar-receiving notch intermediate said opposite ends and a pair of integrally transversely oppositely extended arms of predetermined length in abutment with the arms of adjacent lower guards when mounted in said spaced relation, said arms of each guard affording a rearwardly facing bearing surface in opposed relation to said mounting arm and immediately adjacent to said notch, the notches of said guards being aligned to define an elongated substantially rectilinear groove, said guards having substantially flat upper surfaces adjacent their respective free ends and disposed in a common plane; an elongated runner bar disposed in said elongated groove defined by said notches and having at least one substantially flat forwardly disposed bearing surface in contact with said rearwardly facing bearing surface of said lower guards and also having at least one substantially flat rearwardly disposed bearing surface; a plurality of cutting teeth mounted on the bar and forwardly extended therefrom for reciprocation with the bar, said teeth having flat lower surfaces slidably engageable with the upper surfaces of the lower guards, and apices forwardly disposed from the bar and spaced longitudinally of the bar in substantially the same relation as the lower guards, said apices projecting forwardly from the free ends of the guards; upper guards mounted on the arm in overlying relation to the teeth, said upper guards providing fingers having rearward ends and being forwardly extended from the arm in juxtaposition to the lower guards and terminating in forward ends disposed rearwardly of the apices of said teeth, the fingers providing substantially flat lower surfaces slidably engageable with said teeth, adjacent fingers being interconnected in paired relationship by substantially flat webs rearwardly of said forward ends, said web terminating adjacent to the rearward ends of said fingers, said web affording an opening intermediate the ends of the fingers and substantially overlying the bar-receiving notches of said lower guards to afford egress for plant cuttings during operation; means clamping the upper guards to said mounting arm and urging said fingers into slidable engagement with said tooth; and shim means interposed between the upper guards and said mounting arm and affording a forwardly disposed bearing surface slidably engageable with the rearwardly disposed bearing surface of said runner bar so that said apices are maintained in an operating position forwardly of the free ends of said lower guards and the forward ends of said fingers.

References Cited in the file of this patent

UNITED STATES PATENTS

| | | |
|---|---|---|
| 888,491 | Hampton | May 26, 1908 |
| 1,879,195 | Gray | Sept. 27, 1932 |
| 2,500,104 | Vutz | Mar. 7, 1950 |
| 3,098,338 | Myers | July 23, 1963 |